April 27, 1926.
E. HOPKINSON ET AL
1,582,219
SEAL FOR CANS AND OTHER CONTAINERS
Filed April 28, 1922
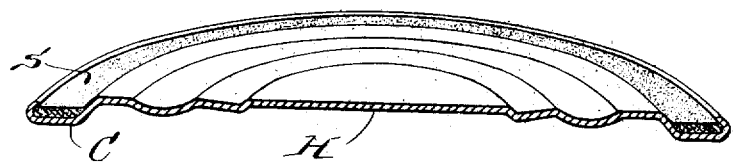
Inventors.
Ernest Hopkinson.
Bradley Dewey.
by Roberts, Roberts & Cushman
Attorneys.

Patented Apr. 27, 1926.

1,582,219

UNITED STATES PATENT OFFICE.

ERNEST HOPKINSON, OF NEW YORK, N. Y., AND BRADLEY DEWEY, OF CAMBRIDGE, MASSACHUSETTS, ASSIGNORS OF ONE-HALF TO DEWEY AND ALMY CHEMICAL COMPANY, OF CAMBRIDGE, MASSACHUSETTS, A CORPORATION OF MASSACHUSETTS, AND ONE-HALF TO GENERAL RUBBER COMPANY, OF NEW YORK, N. Y., A CORPORATION OF NEW JERSEY.

SEAL FOR CANS AND OTHER CONTAINERS.

Application filed April 28, 1922. Serial No. 557,173.

*To all whom it may concern:*

Be it known that we, ERNEST HOPKINSON and BRADLEY DEWEY, both citizens of the United States, residing in New York, county and State of New York, and Cambridge, county of Middlesex, State of Massachusetts, respectively, have invented certain new and useful Improvements in Seals for Cans and Other Containers, of which the following is a full, clear, and exact description.

This invention relates to seals for the joints between the bodies and ends or covers of containers from which air is to be excluded and in which liquid or semi-liquid contents are to be confined. It is especially intended for use in connection with what are known as "sanitary" or open top metal cans, in which no solder is employed, but in which one or both heads are secured to the body by an operation known as "double seaming." The double seaming is done automatically by rolling or spinning together the edge of the can cover and a small flange, which has been previously pressed out from the bottom of the can, into a double seam. The seal is produced by the compressive confinement between the surfaces of the container-body and its end or cover, when these are pressed together, of a material consisting of, or of which the basis is, rubber deposited directly from a water-emulsion of rubber upon a container member, which is adapted not only to fill the seam or joint with an abundance of sealing material, but to maintain its sealing properties unimpaired for practically an indefinite time.

Heretofore the sealing devices which have been used for the purpose mentioned have been composed of cut rubber gaskets, paper gaskets or packings and rubber-cement solutions.

Rubber gaskets are not only expensive but are difficult to apply; they are, moreover, subject to deterioration in respect to elasticity and "life" by exposure to air, sunlight, and heat. Paper gaskets require special machinery and are also difficult to apply. Upon storage the paper may become warped through dampness, causing an imperfect closure; or the seal may be imperfect where there is insufficient moisture in the material packed to cause the necessary swelling of the paper to effect a tight joint.

Rubber cements having a viscosity greater than that represented in the viscosity contained in one-half pound of rubber per gallon of solvent usually give difficulties in manipulation in the ordinary machines. Bearing in mind that the amount of solid material that can be included in the groove in the end of the can in one application is restricted to the solid that may be deposited from a solution which completely fills this groove, it will be observed that the low rubber content of a solution containing one-half pound per gallon materially restricts the amount of rubber that can be used for sealing the can end upon evaporation of the solvent. Volume is emphatically a desideratum in the joint-filling material of the seal, together with plasticity and permanency.

The present invention utilizes rubber in the formation of a seal at the joint or seam between the body and cover of a container, such as a can, but in a form and condition different from the rubber heretofore employed, either as preformed gaskets or as deposits from organic volatile solvents, thus securing the advantageous properties inherent in ample volume of elastic material, permanent retention of elasticity, compressibility, and unbroken continuity, and substantial immunity to deterioration by exposure to air, heat and light. In the practice of this invention, all the practical economic advantages of the known orifice and roller types of applying-machines such as are used extensively by packers and canners with rubber and rubber-compound solutions, are conserved; while the discomforts and dangers incident to the employment of solutions in volatile organic solvents are eliminated.

The invention and improvement herein described is characterized in its broader aspect by the use of a water emulsion of rubber exemplified by that which also occurs naturally as rubber latex, as the material from which to produce by deposit a sealing composition for the seams of tin or other containers. The superior efficiency and greater permanency of a can-seal, or analogous seal, comprising the agglomerated deposit from such a water-emulsion, is due to the large residual volume of deposit after evaporation and to the better ageing properties, i. e. persistent retention of tensile strength, elasticity and compressibility, of this deposit, as compared with rubber deposited from organic volatile solutions, or preformed as gaskets. The deposit from a water-emulsion of rubber, characteristic of our invention, combines the advantages of ample seam-filling quantity possessed by the preformed gasket, and of ease of application in liquid form, possessed by the heretofore used organic solvent solutions of rubber, and is at the same time free from the disadvantage of deteriorability possessed by both these predecessors in the art.

In the drawing hereto annexed which represents a peripherally channeled can head, partly in diametrical section, partly in perspective; H indicates the disc shaped can head, C its peripheral channel, and S the sealing material deposited therein.

In applying a latex emulsion or a composition of which said emulsion is the basis for sealing a can the solution is introduced into a compound applying machine, and the application of the solution to the part to be sealed is made in the usual manner as by filling an annular seam groove in a can head. The emulsion or composition thus deposited is then dried and is ready for the sealing operation. The drying of the water-emulsion of rubber, or the composition of which such emulsion forms the basis involves the deposition and agglomeration of the previously suspended rubber into a continuous strip of substantial volume, of solid, elastic, durable substance. When a natural latex (with its usual preservative such as ammonia) is employed as the water-emulsion, the evaporation of the liquid vehicle and drying of the deposit involves a primary coagulation of the particles of liquid rubber with no appreciable injury to the protective colloid which is deposited in association with the rubber; rubber thus produced by primary coagulation is, we believe, the best obtainable from water-emulsion of rubber, for sealing purposes, because of its possession in high degree and with immunity from deterioration by exposure to air, heat or light, of the strength and resiliency which make for efficiency in the seal when the material is compressively confined between the surfaces of the container body and cover.

The latex employed may be as freshly obtained from the rubber tree, but where it is to be conveyed to a distance 1% to 3% of a water solution of ammonia containing approximately 23% of ammonia gas is preferably added. Normal latex usually contains approximately 65% of moisture and 35% of rubber constituents. The rubber content may however be varied as desired and correspondingly greater or less amount of moisture may be naturally present or may be added and evaporated as desired. Other materials than ammonia having a preservative action upon the latex may be employed, and such latex may be used in the composition as given above.

There may be combined with the latex various fillers, such as carbon black, zinc oxide, ground cork, coloring materials including dye stuffs and pigments, etc. If desired and where possible the substances added to the latex may be in the colloidal condition. In addition there may be combined with the latex various vulcanizing agents preferably those which will exercise their action at temperatures at or below that employed during the canning process, or such other use to which the container may be subjected. It will be noted that in place of ammonia or other preservative approximately 1% of a 40% solution of formaldehyde may be added to latex. It will be observed that in accordance with the above composition the latex which is employed in the machines contains approximately 2.75 lbs. per gallon of solid constituents, whereas in the case of cements ½ lb. of rubber to 1 gallon of solvent is employed. Thus the amount of solid matter which may be deposited from a given quantity of fluid, for example that in the sealing groove of a can, is approximately six times as great in the case of the latex containing 35% solid constituents as in the case of the rubber cement. Even higher concentrations of latex may be employed without passing beyond the range of viscosity which may be satisfactorily employed by the machines. The viscosity of rubber cements, however, containing more than ½ lb. per gallon is apt to cause difficulty in the operation. Where rubber is subjected to mechanical attrition and working on a mill, for the purpose of making smooth cements in organic volatile solvents, it is to some extent, though not seriously, weakened by disruption or disintegration. But, the action of organic volatile solvents, such as naphtha or benzol, is far more destructive of the rubber aggregates than the mechanical stages of preparation, in that the swelling action of these solvents, which are initially absorbed into the rubber, disrupts the rubber, so that, when the solvent evaporates, there are exposed to light, heat and air, large specific surfaces, fresh and highly reactive, promotive of speedy depolymerization and oxidation of the rubber.

Such is not the case with water-emulsions of rubber, wherein the integrity of dispersed rubber aggregates is preserved, and further, protected by the protective colloid films which surround these aggregates individually, while in emulsion or suspension. In the case of natural latex, these rubber aggregates have not even been subjected to mechanical disruption. For these reasons, seals provided with joint-filling material obtained by deposit of rubber from water-emulsion possess superior ageing capacity, i. e. permanency of constitution. This quality is, in comparison with rubber deposits of other derivation, even more pronounced and effective where, for the sake of economy or to modify the elasticity of the deposited material or to give the deposit a distinguishing color, the rubber particles are associated with and dispersed by diluents or fillers, such as have been herein mentioned. Rubber latex, being a water emulsion of rubber, does away with any danger from fire risks which must be considered in the use of rubber cements. At the same time, due to the fact that only water is being evaporated during the drying process, the toxic vapors, which are ordinarily present in the use of cements and in other compositions are eliminated. Although the composition has been described in connection with a particular type of can seal, it will be understood that it may be variously used as a sealing composition.

The expression "rubber-containing latex" and similar expressions contained herein are intended to include water emulsions of rubber derived from any source and to embrace among the naturally-derived substances the latex of not only the rubber trees such as *Hevea brasiliensis*, but also the juices from which balata and gutta percha are derived.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. A container closure provided with a sealing material deposited thereon comprising as its basis rubber characterized by substantial conservation after drying of the integrity of rubber particles dispersed in water-emulsion.

2. A container closure provided with a sealing material deposited thereon comprising as its basis primarily coagulated rubber characterized by substantial conservation after drying of the integrity of rubber particles dispersed in latex-emulsion.

3. The subject matter of claim 1, further characterized by a filter intermixed with the rubber constituent.

4. The subject matter of claim 2, further characterized by a filler intermixed with the rubber constituent.

5. A container-closure provided with a sealing material thereon comprising as its basis rubber deposited from a water-emulsion thereof without disruption, during deposition, of the originally suspended rubber aggregates.

6. A container-closure provided with a sealing material deposited thereon comprising as its basis rubber aggregates derived directly from a water-emulsion of said aggregates, distinguished by retention of the physical constitution as aggregates which characterized them while in water-emulsion, as contrasted with the physical constitution of rubber aggregates after disruptive action thereon by agents such as volatile organic solvents of rubber.

Signed at New York, New York, this 27th day of April, 1922.

ERNEST HOPKINSON.

Signed at Cambridge, Massachusetts, this 21st day of April, 1922.

BRADLEY DEWEY.

case of natural latex, these rubber aggregates have not even been subjected to mechanical disruption. For these reasons, seals provided with joint-filling material obtained by deposit of rubber from water-emulsion possess superior ageing capacity, i. e. permanency of constitution. This quality is, in comparison with rubber deposits of other derivation, even more pronounced and effective where, for the sake of economy or to modify the elasticity of the deposited material or to give the deposit a distinguishing color, the rubber particles are associated with and dispersed by diluents or fillers, such as have been herein mentioned. Rubber latex, being a water emulsion of rubber, does away with any danger from fire risks which must be considered in the use of rubber cements. At the same time, due to the fact that only water is being evaporated during the drying process, the toxic vapors, which are ordinarily present in the use of cements and in other compositions are eliminated. Although the composition has been described in connection with a particular type of can seal, it will be understood that it may be variously used as a sealing composition.

The expression "rubber-containing latex" and similar expressions contained herein are intended to include water emulsions of rubber derived from any source and to embrace among the naturally-derived substances the latex of not only the rubber trees such as *Hevea brasiliensis*, but also the juices from which balata and gutta percha are derived.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. A container closure provided with a sealing material deposited thereon comprising as its basis rubber characterized by substantial conservation after drying of the integrity of rubber particles dispersed in water-emulsion.

2. A container closure provided with a sealing material deposited thereon comprising as its basis primarily coagulated rubber characterized by substantial conservation after drying of the integrity of rubber particles dispersed in latex-emulsion.

3. The subject matter of claim 1, further characterized by a filter intermixed with the rubber constituent.

4. The subject matter of claim 2, further characterized by a filler intermixed with the rubber constituent.

5. A container-closure provided with a sealing material thereon comprising as its basis rubber deposited from a water-emulsion thereof without disruption, during deposition, of the originally suspended rubber aggregates.

6. A container-closure provided with a sealing material deposited thereon comprising as its basis rubber aggregates derived directly from a water-emulsion of said aggregates, distinguished by retention of the physical constitution as aggregates which characterized them while in water-emulsion, as contrasted with the physical constitution of rubber aggregates after disruptive action thereon by agents such as volatile organic solvents of rubber.

Signed at New York, New York, this 27th day of April, 1922.

ERNEST HOPKINSON.

Signed at Cambridge, Massachusetts, this 21st day of April, 1922.

BRADLEY DEWEY.

Certificate of Correction.

It is hereby certified that in Letters Patent No. 1,582,219, granted April 27, 1926, upon the application of Ernest Hopkinson, of New York, N. Y., and Bradley Dewey, of Cambridge, Massachusetts, for an improvement in "Seals for Cans and Other Containers," an error appears in the printed specification requiring correction as follows: Page 3, line 59, claim 3, for the word "filter" read *filler;* and that the said Letters Patent should be read with this correction therein that the same may conform to the record of the case in the Patent Office.

Signed and sealed this 8th day of June, A. D. 1926.

[SEAL.]

M. J. MOORE,
*Acting Commissioner of Patents.*

Certificate of Correction.

It is hereby certified that in Letters Patent No. 1,582,219, granted April 27, 1926, upon the application of Ernest Hopkinson, of New York, N. Y., and Bradley Dewey, of Cambridge, Massachusetts, for an improvement in " Seals for Cans and Other Containers," an error appears in the printed specification requiring correction as follows: Page 3, line 59, claim 3, for the word " filter " read *filler;* and that the said Letters Patent should be read with this correction therein that the same may conform to the record of the case in the Patent Office.

Signed and sealed this 8th day of June, A. D. 1926.

[SEAL.]

M. J. MOORE,
*Acting Commissioner of Patents.*